(12) United States Patent
Watanabe et al.

(10) Patent No.: US 7,205,039 B2
(45) Date of Patent: Apr. 17, 2007

(54) OPTICAL INFORMATION RECORDING MEDIUM, INFORMATION RECORDING METHOD, AND DYE COMPOUND

(75) Inventors: Tetsuya Watanabe, Kanagawa (JP); Naoki Saito, Shizuoka (JP)

(73) Assignee: FujiFilm Corporation, Tokyo (JP)

( * ) Notice: Subject to any disclaimer, the term of this patent is extended or adjusted under 35 U.S.C. 154(b) by 57 days.

(21) Appl. No.: 10/966,186

(22) Filed: Oct. 18, 2004

(65) Prior Publication Data

US 2005/0106352 A1  May 19, 2005

(30) Foreign Application Priority Data

Oct. 17, 2003 (JP) ............... 2003-357376

(51) Int. Cl.
*B32B 3/02* (2006.01)
*C09B 47/04* (2006.01)

(52) U.S. Cl. ............... 428/64.8; 430/270.14; 540/131

(58) Field of Classification Search ............... 428/64.8; 430/270.14, 270.2
See application file for complete search history.

(56) References Cited

U.S. PATENT DOCUMENTS

| | | | | |
|---|---|---|---|---|
| 6,661,770 | B2 * | 12/2003 | Kakuta et al. | 369/275.4 |
| 2002/0076648 | A1 | 6/2002 | Berneth et al. | |
| 2004/0045478 | A1 * | 3/2004 | Tateishi et al. | 106/31.49 |

FOREIGN PATENT DOCUMENTS

| | | |
|---|---|---|
| JP | 2000-108513 A | 4/2000 |
| JP | 2000-113504 A | 4/2000 |
| JP | 2000-149320 A | 5/2000 |
| JP | 2000-158818 A | 6/2000 |
| JP | 2000-218940 A | 8/2000 |
| JP | 2000-222771 A | 8/2000 |
| JP | 2000-222772 A | 8/2000 |
| JP | 2000-263939 A | 9/2000 |
| JP | 2000-280620 A | 10/2000 |
| JP | 2000-280621 A | 10/2000 |
| JP | 2000-318312 A | 11/2000 |
| JP | 2000-318313 A | 11/2000 |
| JP | 2001-39034 A | 2/2001 |
| JP | 2001-253171 A | 9/2001 |
| JP | 2001-287460 A | 10/2001 |
| JP | 2001-287465 A | 10/2001 |
| JP | 2002-301870 A | 10/2002 |
| JP | 2003-94828 A | 4/2003 |
| JP | 2003-309828 A | 4/2003 |

OTHER PUBLICATIONS

S.V. Barkanova et al.: "Effect of Fluorine-Containing Substituents on some characteristics of Phthalocyanines", Zhurnal Organicheskoi Khimii-Engl. Transl., vol. 15, No. 8, 1979, pp. 1589-1592, XP009043840.

S.V. Barkanova et al.: "Oxidation-Reduction Reactions of Phthalocyanines and allied Compounds", Zhurnal Obshchei Khimii-Engl. Transl., vol. 58, No. 6, 1988, pp. 1262-1266, XP009043841.

I.G. Oksengendler et al.: "Trifluoromethylthio-and trifluoromethylsulfonyl-substituted Phthalocyanines", Zhurnal Orbanicheskoi Khimii, vol. 14, No. 5, 1978, pp. 1046-1050, XP009043844.

* cited by examiner

*Primary Examiner*—Bruce H. Hess
(74) *Attorney, Agent, or Firm*—Sughrue Mion, PLLC

(57) ABSTRACT

An optical information recording medium whose recording layer includes a phthalocyanine derivative having a substituent of the following formula (I):

$$-\overset{O}{\underset{O}{\overset{\|}{\underset{\|}{S}}}}-C\overset{R^1}{\underset{R^3}{\overset{/}{\diagdown}}}R^2 \quad \text{Formula (I)}$$

(in the formula (I), $R^1$, $R^2$ and $R^3$ each independently represent a substituent other than a hydrogen atom).

A dye compound represented by the following formula (II):

Formula (II)

(in the formula (II), M represents a metal or a metal oxide each of which may have a ligand. $R^4$, $R^5$ and $R^6$ each independently represent a substituent other than a hydrogen atom, and n is an integer of from 1 to 8).

16 Claims, No Drawings

OPTICAL INFORMATION RECORDING MEDIUM, INFORMATION RECORDING METHOD, AND DYE COMPOUND

CROSS-REFERENCE TO RELATED APPLICATION

This application claims priority under 35 USC 119 from Japanese patent Application No. 2003-357376, the disclosure of which is incorporated by reference herein.

BACKGROUND OF THE INVENTION

1. Field of the Invention

The present invention relates to an optical information recording medium and an information recording method capable of recording and reproducing information by using a laser light, and a dye compound suitable for the medium and method. The invention particularly relates to a heat-mode type optical information recording medium and an information recording method suitable for recording of information by using a short wavelength laser light at a wavelength of 450 nm or shorter, and a dye compound suitable for the medium and method.

2. Description of the Related Art

Information recording media (optical disk) capable of recording information only for once by a laser light have been known. The optical disks are referred to also as writing once CD (so-called CD-R). A typical structure thereof comprises a transparent disk-like substrate. The structure also comprises a recording layer comprising an organic dye, a light reflection layer comprising a metal such as gold, and a protective layer made of a resin staked in this order on the substrate. Recording of information on a CD-R is conducted by irradiating the CD-R with a near-infrared layer light (usually, a laser light at a wavelength near 780 nm). The irradiated portion of the recording layer absorbs the light and is locally heated to cause physical or chemical changes (for example, pit formation) and changes its optical characteristics, thereby recording information. On the other hand, reading (reproduction) of the information is also conducted by radiating a laser light at the same wavelength with that of the laser light for recording. Information is reproduced by detecting the difference of the reflectivity between a portion in which the optical characteristics of the recording layer are changed (recording portion) and a portion in which the characteristic are not changed (non-recording portion).

Recently, networks such as the Internet and high-definition TVs have been rapidly spreading. Further, broadcasting of HDTV (High Definition Television) will start in the near future. Needs for large capacity recording media for recording image information easily at a reduced cost have been increased more and more. While CD-R and DVD-R, which enable high density recording by using a visible laser light (630 nm to 680 nm) as a recording laser, are predicted to be used as large capacity recording media in some areas, media having larger capacity than those media will be needed in the future. Optical disks have been developed which have a larger recording capacity with higher recording density owing to use of a laser light at a still shorter wavelength than DVD-R. For example, an optical information recording medium has been sold which is referred to as Blue-ray system and which uses a blue laser at 405 nm.

A method of recording information and reproducing information on an optical information recording medium has been disclosed wherein the recording medium has a recording layer containing an organic dye. The method comprises irradiating the medium with a laser light at a wavelength of 530 nm or shorter from the recording layer side to the light reflection layer side. Specifically, an information recording and reproducing method has been proposed which comprises irradiating an optical disk with a laser light of blue color (wavelength: 400 to 430 nm, 488 nm) or blue green color (wavelength: 515 nm), the disk comprising, for example, a porphyrin compound, azo dye, metal azo dye, quinophthalone dye, trimethine cyanine dye, dicyanovinylphenyl skeleton dye, coumarin compound, or naphthalocyanine compound.

The prior art which discloses dyes usable in the blue laser light recording disks includes the following patent documents: JP-A (Japanese Patent Application Laid-open) No. 2001-287460; JP-A No. 2001-287465; JP-A No. 2001-253171; JP-A No. 2001-39034; JP-A No. 2000-318313; JP-A No. 2000-318312; JP-A No. 2000-280621; JP-A No. 2000-280620; JP-A No. 2000-263939; JP-A No. 2000-222772; JP-A No. 2000-222771; JP-A No. 2000-218940; JP-A No. 2000-158818; JP-A No. 2000-149320; JP-A No. 2000-108513; JP-A No. 2000-113504; JP-A No. 2002-301870; JP-A No. 2001-287465; US-A No. 2002/76648A1; and JP-A No. 2003-94828.

However, according to the study made by the present inventors, the recording characteristics of the optical disks are not satisfactory which include known dyes described in the above-listed patent publications. Accordingly, further improvement is necessary particularly in recording sensitivity.

SUMMARY OF THE INVENTION

The present invention was made, taking the above problems into consideration. The invention provides an optical information recording medium capable of recording and reproducing information at high density by irradiation with a laser light of a short wavelength. The recording medium is particularly excellent in the recording sensitivity. Further, the invention provides an information recording method capable of recording and reproducing information at high density by irradiation with a laser light at a wavelength of 450 nm or less. Particularly, the recording method provides excellent recording sensitivity. Further, the invention provides a dye compound suitable for the optical information recording medium and information recording method described above.

As a result of intensive studies, the present inventors have found a dye compound of a specific structure overcomes the problems and have accomplished the present invention.

A first aspect of the invention is to provide an optical information recording medium comprising a substrate and a recording layer provided on the substrate, wherein the recording layer includes a phthalocyanine derivative having a substituent and the substituent is represented by the following formula (I):

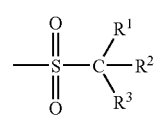

Formula (I)

wherein in the formula (I), $R^1$, $R^2$ and $R^3$ each independently represent a substituent other than a hydrogen atom.

A second aspect of the present invention is to provide an information recording method comprising:

providing the optical information recording medium of the first aspect; and recording information by irradiating the optical information recording medium with a laser light at a wavelength of 450 nm or shorter.

Furthermore, the invention provides a dye compound represented by the following formula (II):

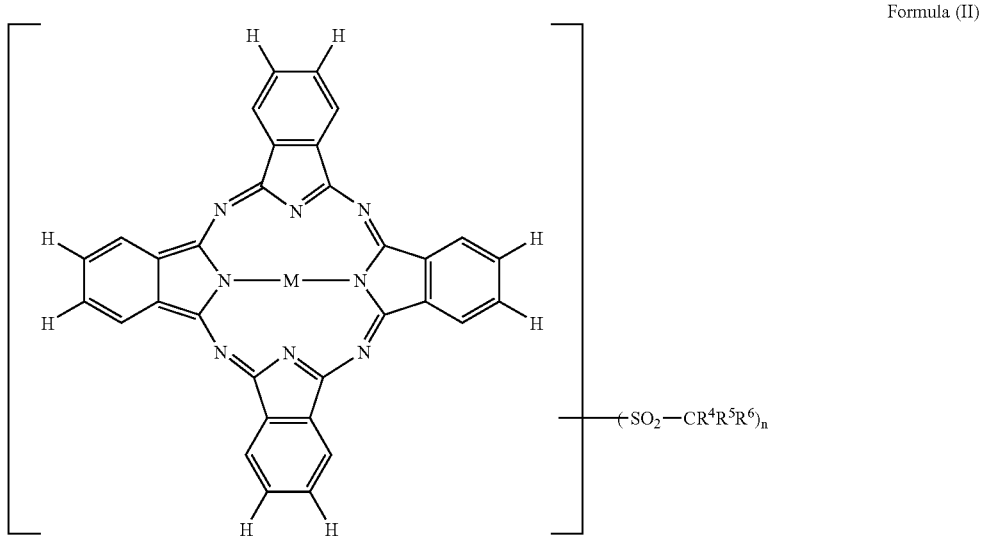

Formula (II)

In the formula (II), M represents one of the following: a metal selected from the group consisting of copper, nickel, iron, cobalt, palladium, magnesium, aluminum, zinc, silicon and vanadium; or an oxide containing at least one of the metals. The metal and the oxide may have a ligand. $R^4$, $R^5$ and $R^6$ each independently represent a substituent other than a hydrogen atom and n is an integer of 1 to 8.

DESCRIPTION OF THE PRESENT INVENTION

The optical information recording medium, the information recording method, and the dye compound according to the invention are described in the following in details.

[Optical Information Recording Medium]

The optical information recording medium according to the invention is an optical information recording medium comprising a substrate and a recording layer provided on the substrate, wherein the recording layer includes a phthalocyanine derivative having a substituent represented by the following formula (I). The recording layer enables recording of information by irradiation with a laser.

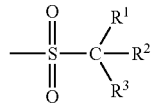

Formula (I)

In the formula (I), $R^1$, $R^2$ and $R^3$ each independently represent a substituent other than a hydrogen atom.

The substituent represented by the formula (I) may be substituted on the α-position of the phthalocyanine derivative, The center metal or center metal compound of the phthalocyanine derivative may be a metal selected from the group consisting of copper, nickel, iron, cobalt, palladium, magnesium, aluminum, zinc, silicon and vanadium, or an oxide including at least one of the metals, wherein the metal or metal oxide may have a ligand.

A light reflection layer comprising a metal may be included in the medium.

A protective layer may be included in the medium.

The substrate may be a transparent disk-like substrate having pre-grooves at a track pitch of from 0.2 to 0.5 μm, and the recording layer may be provided on the pre-groove side of the surface.

The substituent represented by the formula (I) provides the phthalocyanine derivative having the substituent with appropriate absorption characteristics and improved thermal decomposition characteristics upon laser irradiation. Therefore, high density recording and reproduction of information by irradiation with a laser light at short wavelength is possible when the phthalocyanine derivative having the substituent is included in the recording layer. Particularly, the recording sensitivity can be improved.

In the formula (I), $R^1$, $R^2$ and $R^3$ each independently represent a substituent other than a hydrogen atom.

Examples of the substituent include, halogen atom, alkyl groups (including cycloalkyl groups and bicycloalkyl groups), alkenyl groups (including cycloalkenyl groups and bicycloalkenyl groups), alkynyl groups, aryl groups, heterocyclic groups, cyano group, hydroxyl group, nitro group, carboxyl group, alkoxy groups, aryloxy groups, silyloxy groups, heterocyclyloxy groups, acyloxy groups, carbamoyloxy groups, alkoxycarbonyloxy groups, aryloxy carbonyloxy groups, amino groups (including anilino groups), acylamino groups, aminocarbonyl amino groups, alkoxycarbonyl amino groups, aryloxycarbonyl amino groups, sulfamoylamino groups, alkylsulfonylamino groups, arylsulfonylamino groups, mercapto group, alkylthio groups, arylthio groups, heterocyclylthio groups, sulfamoyl group, sulfo group, alkyl sulfinyl groups, aryl-sulfinyl groups, alkylsulfonyl groups, arylsulfonyl groups, acyl groups, aryloxycarbonyl groups, alkoxycarbonyl groups, carbamoyl groups, arylazo groups, heterocyclylazo groups, imide groups, phosphino groups, phosphinyl groups, phosphinyloxy groups, phosphinylamino groups, and silyl groups. Further, any two of $R^1$, $R^2$ and $R^3$ may combine to each other to form a ring.

More specifically, $R^1$, $R^2$ and $R^3$ each independently represent a group selected from the following:

a halogen atom (for example, a chlorine atom, a bromine atom or an iodine atom);

an alkyl group [wherein the alkyl group represents a linear, branched or cyclic substituted or non-substituted alkyl group, examples thereof include alkyl groups (preferably, alkyl groups each having 1 to 30 carbon atoms, such as methyl, ethyl, n-propyl, isopropyl, t-butyl, n-octyl, eicosyl, 2-chloroethyl, 2-cyanoethyl or 2-ethylhexyl), cycloalkyl groups (preferably, substituted or non-substituted cycloalkyl groups each having 3 to 30 carbon atoms such as cyclohexyl, cyclopentyl, or 4-n-dodecylcyclohexyl), bicycloalkyl groups (preferably substituted or non-substituted bicycloalkyl groups each having 5 to 30 carbon atoms, namely, monovalent groups obtained by removing one hydrogen atom from a bicycloalkanes each having 5 to 30 carbon atoms such as bicyclo[1,2,2] and heptane-2-yl, bicyclo[2,2,2]octane-3-yl), and a tricyclo structure having many ring stricture. An alkyl group in substituents described in the following is, for example an alkyl group of an alkylthio group, also represents an alkyl defined by such concept];

an alkenyl group [wherein the alkenyl group represents a linear, branched, cyclic substituted or non-substituted alkenyl group, examples thereof include alkenyl groups (preferably substituted or non-substituted alkenyl groups each having 2 to 30 carbon atoms such as vinyl, allyl, prenyl, geranyl or oleyl), cycloalkenyl groups (preferably, substituted or non-substituted cycloalkenyl groups each having 3 to 30 carbon atoms, namely, monovalent groups obtained by removing one hydrogen atom from a cycloalkene each having 3 to 30 carbon atoms such as 2-cyclopentene-1-yl or 2-cyclohexene-1-yl), bicycloalkenyl groups (substituted or non-substituted bicycloalkenyl groups, preferably, substituted or non-substituted bicycloalkenyl groups having 5 to 30 carbon atoms, namely monovalent groups obtained by removing one hydrogen atom from bicycloalkenes each having one double bond, such as bicycle[2,2,1]hepto-2-en-1-yl and bicycle[2,2,2]octo-2-en-4-yl)];

an alkynyl group (preferably a substituted or non-substituted alkynyl group having 2 to 30 carbon atoms such as ethynyl, propargyl, or trimethylsilylethynyl group;

an aryl group (preferably a substituted or non-substituted aryl group having 6 to 30 carbon atoms such as phenyl, p-tolyl, naphtyl, m-chlorophenyl, or o-hexadecanoylaminophenyl);

a heterocyclic group (preferably, a monovalent group obtained by removing one hydrogen atom from a substituted or non-substituted aromatic or non-aromatic heterocyclic compound, more preferably, 5-membered or 6-membered aromatic heterocyclic group having 3 to 30 carbon atoms, such as 2-furyl, 2-thienyl, 2-pyrimidinyl, or 2-benzothiazolyl);

a cyano group;
a hydroxyl group;
a nitro group;
a carboxyl group;
an alkoxy group (preferably, a substituted or non-substituted alkoxy group having 1 to 30 carom atoms such as methoxy, ethoxy, isopropoxy, t-butoxy, n-octyloxy, or 2-methoxyethoxy);

an aryloxy group (preferably, a substituted or non-substituted aryloxy group having 6 to 30 carbon atoms such as phenoxy, 2-methylphenoxy, 4-t-butylphenoxy, 3-nitrophenoxy, or 2-tetradecanoylaminophenoxy);

a silyloxy group (preferably, a silyloxy group having 3 to 20 carbon atoms such as trimethyl silyloxy or t-butyldimethylsilyloxy);

a heterocyclyloxy group (preferably, a substituted or non-substituted heterocyclyloxy group having 2 to 30 carbon atoms such as 1-phenyl tetrazol-5-oxy or 2-tetrahydropiranyloxy);

an acyloxy group (preferably, a formyloxy group, a substituted or non-substituted alkylcarbonyloxy group having 2 to 30 carbon atoms, a substituted or non-substituted arylcarbonyloxy group having 6 to 30 carbon atoms, such as formyloxy, acetyloxy, pivaloyloxy, stearoyloxy, benzoyloxy, or p-methoxyphenylcarbonyloxy);

a carbamoyloxy group (preferably, a substituted or non-substituted carbamoyloxy group having 1 to 30 carbon atoms, such as N,N-dimethylcarbamoyloxy, N,N-diethylcarbamoyloxy, morpholinocarbonyloxy, N,N-di-n-octylaminocarbonyloxy, or N-n-octylcarbamoyloxy);

an alkoxycarbonyloxy group (preferably, a substituted or non-substituted alkoxycarbonyloxy group having 2 to 30 carbon atoms, such as methoxycarbonyloxy, ethoxycarbonyloxy, t-butoxycarbonyloxy, or n-octylcarbonyloxy);

an aryloxycarbonyloxy group (preferably, a substituted or non-substituted aryloxycarbonyloxy group having 7 to 30 carbon atoms, such as phenoxycarbonyloxy, p-methoxyphenoxycarbonyloxy, p-n-hexadecyloxyphenoxycarbonyloxy);

an amino group (preferably, an amino group, a substituted or non-substituted alkylamino group having 1 to 30 carbon atoms, a substituted or non-substituted anilino group having 6 go 30 carbon atoms, such as amino, methylamino, dimethylamino, aniline, N-methyl-anilino, or diphenylamino);

an acylamino group (preferably, a formylamino group, a substituted or non-substituted alkylcarbonylamino group having 1 to 30 carbon atoms, or a substituted or non-substituted arylcarbonylamino group having 6 to 30 carbon atoms, such as formylamino, acetylamino, pivaloylamino, lauroylamino, benzoylamino, or 3,4,5-tri-n-octyloxyphenylcarbonylamino);

an aminocarbonylamino group (preferably, a substituted or non-substituted aminocarbonylamino having 1 to 30 carbon atoms, such as carbamoylamino, N,N-dimethylaminocarbonylamino, N,N-diethylaminocarbonylamino, or morpholinocarbonylamino);

an alkoxycarbonylamino group (preferably, substituted or non-substituted alkoxycarbonylamino group having 2 to 30 carbon atoms, such as methoyxcarbonylamino, ethoxycarbonylamino, t-butoxycarbonylamino, n-octadexyloxycarbonylamino, or N-methylmethoxycarbonylamino);

an aryloxycarbonylamino group (preferably, a substituted or non-substituted aryloxycarbonylamino group having 7 to 30 carbon atoms, such as phenoxycarbonylamino, p-chlorophenoxy carbonylamino, or m-n-octyloxyphenoxy carbonylamino);

a sulfamoylamino group (preferably, a substituted or non-substituted sulfamoylamino group having 0 to 30 carbon atoms, such as sulfamoylamino, N,N-dimethylaminosulfonylamino, or N-n-octylaminosulfonylamino);

an alkylsulfonylamino or arylsulfonylamino group (preferably, a substituted or non-substituted alkylsulfonylamino having 1 to 30 carbon atoms, or a substituted or non-substituted arylsulfonylamino having 6 to 30 carbon atoms, such as methylsulfonylamino, butylsulfonylamino, phenylsulfonylamino, 2,3,5-trichlorophenylsulfonylamino, or p-methylphenylsulfonylamino);

a mercapto group;

an alkylthio group (preferably, a substituted or non-substituted alkylthio group having 1 to 30 carbon atoms, such as methylthio, ethylthio, or n-hexadecylthio);

an arylthio group (preferably, a substituted or non-substituted arylthio having 6 to 30 carbon atoms, such as phenylthio, p-chlorophenylthio, or m-methoxyphenylthio);

a heterocyclylthio group (preferably, a substituted or non-substituted heterocyclylthio group having 2 to 30 carbon atoms, such as 2-benzothiazorylthio or 1-phenyltetrazol-5-ylthio);

a sulfamoyl group (preferably, a substituted or non-substituted sulfamoyl group having 0 to 30 carbon atoms, such as N-ethylsulfamoyl, N-(3-dodecyloxypropyl) sulfamoyl, N,N-dimethylsulfamoyl, N-acetylsulfamoyl, N-benzoylsulfamoyl, or N-(N'-phenylcarbamoyl)sulfamoyl);

a sulfo group;

an alkylsulfinyl or arylsulfinyl group (preferably, a substituted or non-substituted alkylsulfinyl group having 1 to 30 carbon atoms or a substituted or non-substituted arylsulfinyl group having 6 to 30 carbon atoms, such as methylsulfinyl, ethyl sulfinyl, phenylsulfinyl, or p-methylphenylsulfinyl);

an alkyl sulfonyl or arylsulfonyl group (preferably, a substituted or non-substituted alkylsulfonyl group having 1 to 30 carbon atoms or a substituted or non-substituted arylsulfonyl group having 6 to 30 carbon atoms, such as methylsulfonyl, ethylsulfonyl, phenylsulfonyl, or p-methylphenylsulfonyl);

an acyl group (preferably, a formyl group, a substituted or non-substituted alkylcarbonyl group having 2 to 30 carbon atoms, a substituted or non-substituted arylcarbonyl group having 7 to 30 carbon atoms, or a substituted or non-substituted heterocyclic carbonyl group having 4 to 30 carbon atoms in which a carbon atom in the heterocycle is bonded to the carbonyl group, such as acetyl, pivaloyl, 2-chloroacetyl, stearoly, benzoyl, p-n-octyloxyphenylcarbonyl, 2-pyridyl carbonyl, or 2-furylcarbonyl);

an aryloxycarbonyl group (preferably, a substituted or non-substituted aryloxycarbonyl group having 7 to 30 carbon atoms, such as phenoxycarbonyl, o-chlorophenoxycarbonyl, m-nitrophenoxycarbonyl, or p-t-butylphenoxycarbonyl);

an alkoxycarbonyl group (preferably, a substituted or non-substituted alkoxycarbonyl group having 2 to 30 carbon atoms, such as methoxycarbonyl, ethoxycarbonyl, t-butoxycarbonyl, n-octadecyloxycarbonyl);

a carbamoyl group (preferably, a substituted or non-substituted carbamoyl having 1 to 30 carbon atoms, such as carbamoyl, N-methylcarbamoyl, N,N-dimethylcarbamoyl, N,N-di-n-octylcarbamoyl, or N-(methylsulfonyl)carbamoyl);

an arylazo group or heterocyclylazo group (preferably, a substituted or non-substituted arylazo group having 6 to 30 carbon group, a substituted or non-substituted heterocyclylazo group having 3 to 30 carbon atoms, such as phenylazo, p-chlorophenylazo or 5-ethylthio-1,3,4-thiadiazol-2-ylazo);

an imide group (preferably, N-succineimide or N-phthalimide);

a phosphino group (preferably, a substituted or non-substituted phosphino group having 2 to 30 carbon atoms, such as dimethylphosphino, diphenylphosphino, or methylphenoxyphosphino);

a phosphinyl group (preferably, a substituted or non-substituted phosphinyl group having 2 to 30 carbon atoms, such as phosphinyl, dioctyloxyphosphinyl or diethoxyphosphinyl);

a phosphinyloxy group (preferably, a substituted or non-substituted phosphinyloxy group having 2 to 30 carbon atoms, such as diphenoxyphosphinyloxy or dioctyloxyphosphinyloxy);

a phosphinylamino group (preferably, a substituted or non-substituted phosphinylamino group having 2 to 30 carbon atoms, such as dimethoxyphosphinylamino or dimethylaminophsphinylamino); or a silyl group (preferably, a substituted or non-substituted silyl group having 3 to 30 carbon atoms, such as trimethylsilyl, t-butyldimethylsilyl, or phenyldimethylsilyl).

If a functional group selected from the above functional groups has a hydrogen atom, the hydrogen atom may be replaced with the group described above. Examples of such a functional group include alkylcarbonyl aminosulfonyl groups, arylcarbonyl aminosulfonyl groups, alkylsulfonyl aminocarbonyl groups, and arylsulfonyl aminocarbonyl groups. Their examples include methylsulfonylaminocarbonyl, p-methylphenylsulfonylaminocarbonyl, acetylaminosulfonyl, and benzoylaminosulfonyl groups. $R^1$, $R^2$ and $R^3$ may be further substituted with a substituent.

$R^1$, $R^2$ and $R^3$ each are preferably a halogen atom, a substituted or non-substituted alkyl group having 1 to 30 carbon atoms, a substituted or non-substituted aryl group having 6 to 30 carbon atoms, a 5- or 6-membered substituted or non-substituted heterocyclic group, a cyano group, a substituted or non-substituted alkoxy group having 1 to 30 carbon atoms, a substituted or non-substituted alkylcarbonyl group having 2 to 30 carbon atoms, a substituted or non-substituted arylcarbonyl group having 7 to 30 carbon atom, a substituted or non-substituted alkoxycarbonyl group having 2 to 30 carbon atoms, or a substituted or non-substituted aryloxycarbonyl group having 7 to 30 carbon atom. $R^1$, $R^2$ and $R^3$ each are more preferably a halogen atom, an alkyl group having 1 to 30 carbon atoms, a cyano group, a substituted or non-substituted alkylcarbonyl group having 2 to 30 carbon atoms, or a substituted or non-substituted alkoxycarbonyl group having 2 to 30 carbon atoms.

The substitution position of the substituent represented by the formula (I) on the phthalocyanine derivative is preferably the α-position on the phthalocyanine ring.

When the position is the α-position, since the absorption characteristic of the phthalocyanine derivative is more preferable and larger strain can be provided to the phthalocyanine ring than the case of substitution at the β-position, the thermal decomposition characteristics upon laser irradiation are improved and an effect of further improvement in the sensitivity can be obtained.

The α-positions on the phthalocyanine ring generally mean substitution positions nearer to the pyrrole ring in benzopyrrole rings which are partial structures of the phthalocyanine ring and, specifically, they are substitution positions of $R^{\alpha 1}$ to $R^{\alpha 8}$ in the phthalocyanine general structure represented by the following formula (III).

In the general structure represented by the following formula (III), any two substituents adjacent to each other selected from $R^{\alpha 1}$ to $R^{\alpha 8}$ and $R^{\beta 1}$ to $R^{\beta 8}$ may form a ring, but it is preferred that none of $R^{\alpha 1}$ to $R^{\alpha 8}$ and $R^{\beta 1}$ to $R^{\beta 8}$ forms the ring.

Formula (III)

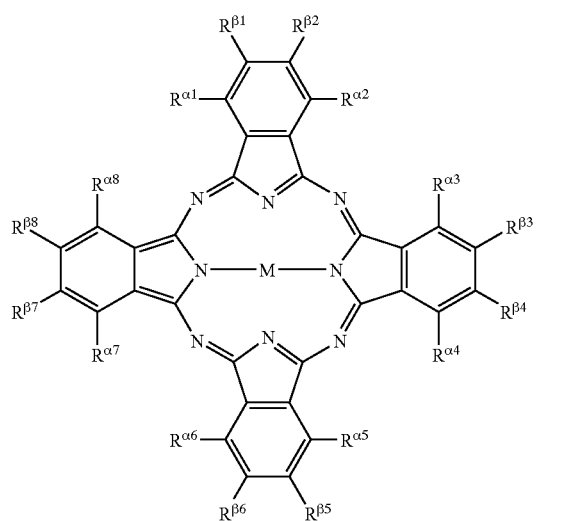

The phthalocyanine derivative according to the invention (corresponding to the later-described dye compound of the invention) may have a center metal or a center metal compound or may not have such metals (hydrogen-substituted body) but it preferably has a center metal or a center metal compound. The center metal or center metal compound is preferably a metal selected from the group consisting of copper, nickel, iron, cobalt, palladium, magnesium, aluminum, zinc, silicon and vanadium, an oxide containing at least one of the metals described above, wherein the metal or oxide may have a ligand (for example, a halogen atom, an aryl group having 6 to 30 carbon atoms, a 5-membered or 6-membered heterocyclic group, a cyano group, or a hydroxyl group).

Among them, silicon, copper, nickel and palladium are preferred and copper is more preferred.

The phthalocyanine derivative may have other substituents than those of the formula (I) and examples of such other substituents include the substituents cited as the examples of $R^1$, $R^2$ and $R^3$.

Any positions on the phthalocyanine derivative molecule may be bonded to other phthalocyanine derivative molecules to form a multimer. In this case, each of the molecules may be the same as or different from each other. Further, the phthalocyanine derivative may be bonded to a polymer chain such as polystyrene, polymethacrylate, polyvinyl alcohol or cellulose.

Further, only a single kind of phthalocyanine derivative may be used or plural kinds of phthalocyanine derivatives having different structures may be used in admixture. Particularly, with an aim of preventing crystallization of the recording layer, a mixture of isomers which are different in positions of substituents is used preferably.

The optical information recording medium of the invention has a recording layer on a substrate, the recording layer including the phthalocyanine derivative described above. The optical information recording medium of the invention may have any of various constitutions. The optical information recording medium preferably has a constitution in which a recording layer, an optical reflection layer and a protective layer are provided in this order on a disk-like substrate with a pre-grooves at a certain track pitch, or a structure in which a light reflection layer, a recording layer and a protective layer are provided in this order on the substrate. Further, a constitution is also preferred which is obtained by providing two transparent disk-like substrates having pre-grooves at a certain track pitch, providing a recording layer and a light reflection layer on each substrate, and stacking the substrates so that each recording layer is placed inside.

In the optical information recording medium according to the invention, it is possible to use a substrate having pre-grooves at a narrower track pitch than CD-R or DVD-R in order to attain higher recording density.

In the case of optical information recording medium, the track pitch is preferably within a range of 0.2 to 0.8 μm, more preferably within a range of 0.2 to 0.5 μm, and particularly preferably within a range of 0.27 to 0.40 μm.

The depth of the pre-groove is preferably within a range of 0.03 to 0.18 μm, more preferably within a range of 0.05 to 0.15 μm, and particularly preferably, within a range of 0.06 to 0.1 μm.

The optical information recording medium of the invention is described below using a constitution in which a recording layer, a light reflection layer and a protective layer are provided in this order on a transparent disk-like substrate as an example.

(Substrate)

The substrate can be selected arbitrarily from various kinds of materials which have been used as a substrate of conventional optical information recording media. The substrate material can be, for example, glass, polycarbonate, an acrylic resin such as polymethyl methacrylate, a vinyl chloride resin such as polyvinyl chloride or a vinyl chloride copolymer, an epoxy resin, an amorphous polyolefin and a polyester, and these materials may be used in combination if necessary. Further, the materials can be used in a form of a film or can be a rigid substrate. Among the materials described above, polycarbonate is preferred from the viewpoint of moisture resistance, dimensional stability and cost. The thickness of the substrate is preferably from 0.5 to 1.2 mm.

In order to improve the planarity, increasing the adhesion and preventing deterioration of the recording layer, an undercoat coating layer may be provided on the side of the substrate (on the side of the pre-groove surface) which side is to be provided with the recording layer.

The material of the undercoat layer may include, for example, polymeric materials such as polymethyl methacrylate, acrylic acid-methacrylic acid copolymer, styrene-maleic acid anhydride copolymer, polyvinyl alcohol, N-methylol acrylamide, styrene-vinyltoluene copolymer, chlorosulfonated polyethylene, nitrocellulose, polyvinyl chloride, chlorinated polyolefin, polyester, polyimide, vinyl acetate-vinyl chloride copolymer, ethylene-vinyl acetate copolymer, polyethylene, polypropylene and polycarbonate; as well as a surface modifier such as a silane coupling agent. The undercoat layer can be formed by dissolving or dispersing the material described above in an appropriate solvent to prepare a coating liquid then coating the coating liquid on a substrate surface by a coating method such as spin coating, dip coating or extrusion coating. The layer thickness of the undercoat layer is generally within a range of 0.005 to 20 μm and, preferably within a range of 0.01 to 10 μm.

(Recording Layer)

The recording layer can be formed by a method such as vapor-deposition, sputtering, CVD or coating by use of solvent, and coating by use of solvent is preferred. In this case, the recording layer can be formed by a process comprising: preparing a coating liquid by dissolving the phthalocyanine derivative (the dye compound of the invention) and optional substances such as a quencher and a binder into a solvent; coating the surface of a substrate with the coating liquid to form a film; and drying the film. The solvent in the coating liquid can be an ester such as butyl acetate, ethyl lactate or cellosolve acetate; a ketone such as methyl ethyl ketone, cyclohexananone or methylisobutylketone; a chlorinated hydrocarbon such as dichloromethane, 1,2-dichloroethane or chloroform; an amide such as dimethylformamide; a hydrocarbon such as methylcyclohexane; an ether such as dibutylether, diethyl ether, tetrahydrofuran or dioxine; an alcohol such as ethanol, n-propanol, isopropanol, n-butanol or diacetone alcohol; a fluoric solvent such as 2,2,3,3-tetrafluoropropanol; or a glycol ether such as ethylene glycol monomethyl ether, ethylene glycol monoethyl ether or propylene glycolmonomethyl ether. Only a single kind of solvent may be used or plural kinds of solvents may be used in combination depending on solubility of the dye used. Various kinds of additives such as antioxidants, UV-absorbers, plasticizers and lubricants may be added in the coating liquid in accordance with purpose.

When a binder is used, examples of the binder can include natural organic polymeric materials such as gelatin, cellulose derivatives, dextrane, rosin and rubber, synthetic organic polymers whose examples include precondensates of thermosetting resins such as: hydrocarbon resins such as polyethylene, polypropylene, polystyrene and polyisobutylene; vinylic resins such as polyvinyl chloride, polyvinylidene chloride, and polyvinyl chloride-polyvinyl acetate copolymer; acrylic resins such as methyl polyacrylate, methyl polymethacrylate; polyvinyl alcohol; chlorinated polyethylene; epoxy resin; butyral resin; rubber derivatives; and phenol-formaldehyde resin. When the recording layer material includes a binder, the amount of the binder to be used is generally within a range of 0.01 to 50 times (weight ratio) the amount of the dye, preferably, within a range from 0.1 to 5 times (weight ratio) the amount of the dye. The concentration of the dye in the coating liquid prepared as described above is generally within a range from 0.01 to 10% by weight, preferably within a range from 0.1 to 5% by weight.

Examples of the coating method can include, for example, spraying, spin coating, dipping, roll coating, blade coating, doctor-roll coating and screen-printing. There may be only one recording layer or may be plural layers. The thickness of the recording layer is generally within a range of 20 to 500 nm, preferably, within a range of 30 to 300 nm and, more preferably, of 50 to 100 nm.

Various thermal decomposition controllers can be added to the recording layer in order to improve the recording characteristics by controlling the thermal decomposing behavior of the recording layer during laser light irradiation. For example, a method of adding a metal complex as described in EP No. 0600427 is effective. Among the metal complexes, a metallocene derivative is preferred and, particularly, a ferrocene derivative is suitable. Such a thermal decomposition controller may be bonded to the phthalocyanine as a substituent.

Various discoloration inhibitor can be incorporated into the recording layer in order to improve the light fastness of the recording layer. As the discoloration inhibitor, a singlet oxygen quencher is generally used. As the singlet oxygen quencher, singlet oxygen quenchers described in known patent specifications can be utilized. As specific examples, the quenchers described in JP-A Nos. 58-175693, 59-81194, 60-18387, 60-19586, 60-19587, 60-35054, 60-36190, 60-36191, 60-44554, 60-44555, 60-44389, 60-44390, 60-54892, 60-47069, 63-209995, and 4-25492, JP-B Nos. 1-38680 and 6-26028, the specification of GP No. 350399, and in the Journal of Japanese Chemical Society, 1992, October, p. 1141 can be cited.

The amount of the discoloration inhibitor such as the singlet oxygen quencher is usually within a range of 0.1 to 50% by weight, preferably, within a range of 0.5 to 45% by weight, more preferably, within a range of 3 to 40% by weight and, particularly preferably within a range of 5 to 25% by weight.

(Light Reflection Layer)

A light reflection layer is preferably provided on or adjacent to the recording layer in order to improve the reflectance upon reproduction of information. The light reflecting material included in the material of the light reflection layer is a substance having a high reflectance to a laser light and examples thereof include metals or semi metals such as Mg, Se, Y, Ti, Zr, Hf, V, Nb, Ta, Cr, Mo, W, Mn, Re, Fe, Co, Ni, Ru, Rh, Pd, Ir, Pt, Cu, Ag, Au, Zn, Cd, Al, Ga, In, Si, Ge, Te, Pb, Po, Sn and Bi, and stainless steel. Only a single kind of light reflecting material may be used, or plural kinds of light reflecting materials may be used in combination, or alloys including plural kinds of light reflecting materials may be used. Among them, Cr, Ni, Pt, Cu, Ag, Au, Al and stainless steel are preferred. Particularly preferred are Au metal, Ag metal, Al metal or an alloy thereof. Most preferred are Ag metal, Al metal or an alloy thereof. The light reflection layer can be formed on a substrate or a recording layer by vapor depositing, sputtering or ion-plating the light reflecting material described above. The thickness of the light reflection layer is generally within a range of 10 to 300 nm and preferably within a range of 50 to 200 nm.

(Protective layer)

With an aim of physically or chemically protecting the recording layer or the like, a protective layer is preferably provided on the light reflection layer or the recording layer. If the constitution of a medium is the same as DVD-R type optical information recording medium, which is a constitution obtained by adhering two substrates to each other so that the recording layers are positioned inside, the protective layer is optional. Examples of the material used in the protective layer can include inorganic materials such as SiO, $SiO_2$, $MgF_2$, $SnO_2$ and $Si_3N_4$, and organic materials such as thermoplastic resins, thermosetting resins and UV-curable resins. The protective layer can be formed, for example, by laminating the reflection layer with a film obtained by extrusion of a plastic material while using an adhesive in order to adhere the film to the reflection layer. Alternatively, the protective layer may be provided by a method such as vacuum vapor deposition, sputtering, or coating. Further, in a case of the thermoplastic resin or thersmosetting resin, the protective layer can be formed by dissolving the resin in an appropriate solution to prepare a coating liquid, and then coating the coating liquid followed by drying. In a case of the UV-curable resin, the layer can be formed by providing a coating liquid which may be the resin material itself or may be prepared by dissolving the resin material into an appropriate solvent, then coating the coating liquid and radiating a UV light thereby curing the resin. Various additives such as antistatic agents, antioxidants and UV-absorbents may be added to the coating liquid depending on purpose. The thickness of the protective layer is generally within a range of 0.1 μm to 1 mm.

In an optical information recording medium comprising a substrate, and a light reflection layer, a recording layer and a protective layer successively provided on the substrate, a transparent sheet comprising, for example, polycarbonate or cellulose triacetate may also be used as a protective layer.

For example, a reflection layer may be coated with an adhesive (for example, UV-curable resin), laminated with a transparent sheet and irradiated with a light from above the transparent sheet thereby adhering the transparent sheet and the reflection layer. The thickness of the transparent sheet is preferably within a range of 0.01 to 0.2 mm and, more preferably of 0.03 to 0.1 mm.

Further, as the transparent sheet, a polycarbonate sheet provided with an adhesive on the bonding surface may also be used. In this case, the adhesive described above is not necessary.

As described above, a laminate (optical information recording medium) in which a recording layer, a light reflection layer and a protective layer are provided on a substrate can be obtained.

A laminate (optical information recording medium) provided with a light reflection layer, a recording layer and a protective layer on a substrate in this order may also be formed by properly changing the order of the layers.

Further, various other improvements and modifications to the constitution described above may be applied to the optical information recording medium according to the invention. For example, a barrier layer may be provided between the recording layer and the protective layer described above. The material for constituting the barrier layer is not particularly limited so long as it is a material capable of transmitting the laser light and a dielectric material is preferred. Specific examples thereof include inorganic oxides, nitrides and sulfides such as ZnS, $TiO_2$, $SiO_2$, ZnS—$SiO_2$, $GeO_2$, $Si_3N_4$, $Ge_3N_4$, and $MgF_2$. ZnS—$SiO_2$ and $Si_2$ are preferred. The barrier layer can be formed by sputtering, ion plating or the like and its thickness is preferably from 1 to 100 nm.

The optical information recording medium according to the invention can have satisfactory recording and reproducing characteristics such as high reflectance and high modulation factor in addition to the effects described above. That is, recording of information at higher density than conventional CD-R and DVD-R is possible and information recording capacity can be further improved.

[Information Recording Method]

The information recording method according to the invention involves use of the optical information recording medium described above, for example, as shown below. At first, a recording light such as a semiconductor laser light for recording is radiated from the substrate side or from the protective layer side while rotating the optical information recording medium at a constant linear velocity or at a constant angular velocity. It is thought that upon the irradiation with the light, the recording layer absorbs the light to locally increase its temperature to cause physical or chemical changes (for example, formation of pits) and to change its optical characteristics thereby recording the information. In the invention, a semiconductor laser light having an oscillation wavelength within a range from 390 to 450 nm as a recording light is used. Preferable examples of the light source can include a blue-purple semiconductor laser light having an oscillation wavelength within a range from 390 to 415 nm and a blue-purple SHG laser light having a center oscillation wavelength of 425 nm formed by halving a wavelength of an infrared semiconductor laser light having a center oscillation wavelength of 850 nm by using an optical waveguide element. Particularly, use of the blue-purple semiconductor laser light is preferred from a viewpoint of recording density.

The information recorded as described above can be reproduced by irradiating the optical information recording medium with a semiconductor laser light from the substrate side or from the protective layer side while rotating the medium at the same constant linear velocity as described above and detecting the reflection light therefrom.

[Dye Compound]

The dye compound of the invention is represented by the following formula (II) and it is used as the phthalocyanine derivative in the recording layer of the optical information recording medium of the invention.

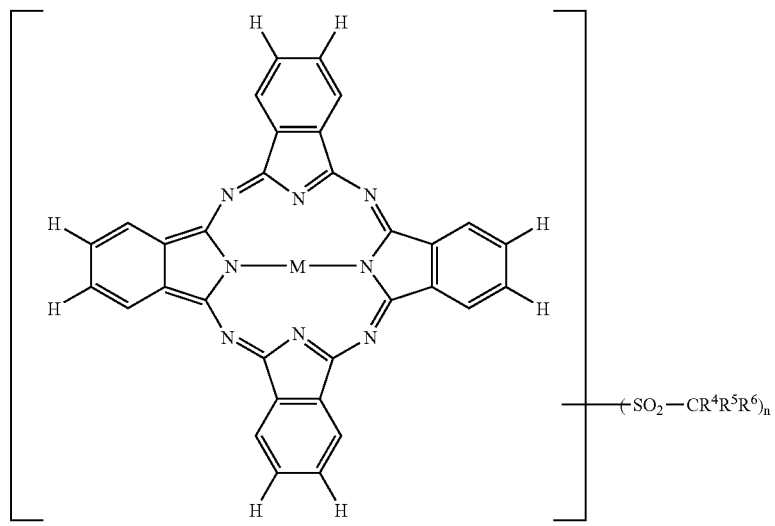

Formula (II)

In the formula (II), M represents a metal selected from the group consisting of copper, nickel, iron, cobalt, palladium, magnesium, aluminum, zinc, silicon and vanadium; or an oxide containing at least one of the metals, wherein the metal or oxide described above may have a ligand. $R^4$, $R^5$ and $R^6$ each independently represent a substituent other than a hydrogen atom, and n is an integer of from 1 to 8.

Further, any two of $R^4$, $R^5$ and $R^6$ may combine to each other to form a ring. Examples of $R^4$, $R^5$ and $R^6$ and preferred examples thereof are the same as the examples of $R^1$, $R^2$ and $R^3$ in the formula (I) and the preferred examples thereof. $R^4$, $R^5$ and $R^6$ each may further be substituted with a substituent. n is an integer of from 1 to 8. The compound of the formula (II) may also have other substituents than the substituent represented by $—SO_2—CR^4R^5R^6$.

Further, as described in the description of the phthalocyanine derivative, the substituent represented by $—SO^2—CR^4R^5R^6$ (substituent represented by the formula (I)) is preferably on the α-position of the phthalocyanine derivative.

In the compound of the formula (II), it is not necessary that all α-positions are substituted with $—SO_2—CR^4R^5R^6$, and the compound may have other substituents on α-positions so long as at least one α-position is substituted with $—SO_2—CR^4R^5R^6$.

Preferred specific examples of the dye compound according to the invention are shown below in Table 1 but the invention is not limited to them.

In the following table 1, an expression, for example, $R^{α1}/R^{α2}$ represents either one of $R^{α1}$ or $R^{α2}$ and, accordingly, the compound with the expression is a mixture of isomers different in substitution positions. Further, in a case of non-substitution, that is, in a case of being substituted with hydrogen, the expression for the hydrogen is omitted.

TABLE 1

Specific examples of the phthalocyanine derivative used in the invention

| Dye compound | Subsitution position and substituent | M |
|---|---|---|
| (I-1) | $R^{α1}/R^{α2}$, $R^{α3}/R^{α4}$, $R^{α5}/R^{α6}$, $R^{α7}/R^{α8}$ —$SO_2C(CH_3)_3$ | Cu |
| (I-2) | $R^{α1}/R^{α2}$, $R^{α3}/R^{α4}$, $R^{α5}/R^{α6}$, $R^{α7}/R^{α8}$ —$SO_2C(CH_3)_2CH_2C(CH_3)_3$ | Cu |
| (I-3) | $R^{α1}/R^{α2}$, $R^{α3}/R^{α4}$, $R^{α5}/R^{α6}$, $R^{α7}/R^{α8}$ —$SO_2C(CH_3)_2CO_2C_2H_5$ | Cu |
| (I-4) | $R^{α1}/R^{α2}$, $R^{α3}/R^{α4}$, $R^{α5}/R^{α6}$, $R^{α7}/R^{α8}$ —$SO_2C(CH_3)_2OCH_3$ | Cu |
| (I-5) | $R^{α1}/R^{α2}$, $R^{α3}/R^{α4}$, $R^{α5}/R^{α6}$, $R^{α7}/R^{α8}$ —$SO_2C(CH_3)_2CN$ | Cu |
| (I-6) | $R^{α1}/R^{α2}$, $R^{α3}/R^{α4}$, $R^{α5}/R^{α6}$, $R^{α7}/R^{α8}$ —$SO_2CF_2CF_2CF_3$ | Cu |
| (I-7) | $R^{α1}/R^{α2}$, $R^{α3}/R^{α4}$, $R^{α5}/R^{α6}$, $R^{α7}/R^{α8}$ —$SO_2C(CH_3)_2CH_2CH_2CO_2Ph$ | Cu |
| (I-8) | $R^{α1}/R^{α2}$, $R^{α3}/R^{α4}$, $R^{α5}/R^{α6}$, $R^{α7}/R^{α8}$ —$SO_2C(CH_3)_2COCH_3$ | Cu |
| (I-9) | $R^{α1}/R^{α2}$, $R^{α3}/R^{α4}$, $R^{α5}/R^{α6}$, $R^{α7}/R^{α8}$ —$SO_2C(CH_3)_3$ | Pd |
| (I-10) | $R^{α1}/R^{α2}$, $R^{α3}/R^{α4}$, $R^{α5}/R^{α6}$, $R^{α7}/R^{α8}$ —$SO_2C(CH_3)_3$ | $SiCl_2$ |
| (I-11) | $R^{α1}/R^{α2}$, $R^{α3}/R^{α4}$, $R^{α5}/R^{α6}$, $R^{α7}/R^{α8}$ —$SO_2C(CH_3)_2CO_2C_2H_5$ | Ni |
| (I-12) | $R^{β1}/R^{β2}$, $R^{β3}/R^{β4}$, $R^{β5}/R^{β6}$, $R^{β7}/R^{β8}$ —$SO_2C(CH_3)_3$ | Cu |
| (I-13) | $R^{α1}/R^{α2}$, $R^{α3}/R^{α4}$, $R^{α5}/R^{α6}$, $R^{α7}/R^{α8}$ —$SO_2C(CH_3)_3$ $R^{β1}/R^{β2}$, $R^{β3}/R^{β4}$, $R^{β5}/R^{β6}$, $R^{β7}/R^{β8}$ —Br | Cu |
| (I-14) | $R^{α1}/R^{α2}$, $R^{α3}/R^{α4}$, $R^{α5}/R^{α6}$, $R^{α7}/R^{α8}$ $R^{β1}/R^{β2}$, $R^{β3}/R^{β4}$, $R^{β5}/R^{β6}$, $R^{β7}/R^{β8}$ —$SO_2C(CH_3)_3$ | Cu |

TABLE 1-continued

Specific examples of the phthalocyanine derivative used in the invention

| Dye compound | Subsitution position and substituent | M |
|---|---|---|
| (I-15) | $R^{α1}/R^{α2}$, $R^{α3}/R^{α4}$, $R^{α5}/R^{α6}$, $R^{α7}/R^{α8}$ —$SO_2C$ (1-Methylcyclohexyl) | Cu |
| (I-16) | $R^{α1}/R^{α2}$, $R^{α3}/R^{α4}$, $R^{α5}/R^{α6}$, $R^{α7}/R^{α8}$ —$SO_2C(CH_3)_3$ | Fe |
| (I-17) | $R^{α1}/R^{α2}$, $R^{α3}/R^{α4}$, $R^{α5}/R^{α6}$, $R^{α7}/R^{α8}$ —$SO_2C(CH_3)_3$ | Co |
| (I-18) | $R^{α1}/R^{α2}$, $R^{α3}/R^{α4}$, $R^{α5}/R^{α6}$, $R^{α7}/R^{α8}$ —$SO_2C(CH_3)_3$ | Mg |
| (I-19) | $R^{α1}/R^{α2}$, $R^{α3}/R^{α4}$, $R^{α5}/R^{α6}$, $R^{α7}/R^{α8}$ —$SO_2C(CH_3)_3$ | Al |
| (I-20) | $R^{α1}/R^{α2}$, $R^{α3}/R^{α4}$, $R^{α5}/R^{α6}$, $R^{α7}/R^{α8}$ —$SO_2C(CH_3)_3$ | Zn |

The Dye compound according to the invention can be synthesized by a method described or cited, for example, in "Phthalocyanine—Chemistry and Function—" co-authored by Shirai and Kobayashi, issued from IPC Co. (pp 1–62), and "Phthalocyanines-Properties and Applications" co-authored by C C. Leznoff and A. B. P. Lever, issued from VCH (pp 1–54), or similar methods.

EXAMPLES

In the following, the present invention is described more specifically by using examples but the invention is not limited to the following examples.

[Synthesis of Dye Compound (I-1) Described in Table 1]

30 ml of butanol was added to 3.0 g of 3-tert-butylsulfonylphthalonitrile and 0.41 g of anhydrous copper chloride and stirred under heating at 80° C. 4.5 ml of DBU (1,8-diazabicyclo[5.4.0]-7-undecene) was added and stirred under heating at 80° C. for 8 hours. The reaction solution after the stirring was cooled to room temperature, and resultant crystals were recovered by filtration, and washed with methanol to obtain 2.0 g of the compound (I-1).

λ max=663 nm ($CH_2Cl_2$)

[Synthesis of Dye Compound (I-2) Described in Table 1]

30 ml of butanol was added to 3.3 g of 3-tert-octylsulfonylphthalonitrile and 0.41 g of anhydrous copper chloride and stirred under heating at 80° C. 4.5 ml of DBU was added and the solution was stirred under heating at 80° C. for 8 hours. The reaction solution after the stirring was cooled to room temperature, and resultant crystals were recovered by filtration, and washed with methanol to obtain 2.2 g of the compound (I-2).

λ max=664 nm ($CHCl_3$)

Example 1

A substrate having a thickness of 1.1 mm was molded by injection-molding using a polycarbonate resin (PANLIGHT AD5503) manufactured by Teijin Kasei Co. On the substrate, the groove track pitch was 320 nm, the groove width (corresponding to half-value width) for the on-groove portion, which is a pre-groove, was 110 nm and the groove depth was 35 nm.

A reflection layer with a thickness of 100 nm was provided on the substrate by a vacuum film-deposition method using a target comprising 98.1 mass parts of Ag, 0.9 mass parts of Pd, and 1.0 mass part of Cu.

The dye compound (I-1) was dissolved in tetrafluoropropanol in an amount of 2.5 g per 100 ml of tetrafluoropropanol. Supersonic waves were applied to the solution for 2 hours to dissolve the dye compound and then the solution was allowed to stand still in a circumstance at 23° C., 50% for 0.5 hr or longer and filtered with a 0.2 μm filter. Using the solution, a recording layer having a thickness of 110 nm was formed on the reflection layer by a spin-coating method.

Then, the layer was heated in a clean oven at 80° C. for one hour. After the heat treatment, a barrier layer having a thickness of 5 nm was provided on the recording layer by a vacuum film-depositing method using a target comprising 8 mass parts of ZnS and 2 mass parts of $SiO_2$.

A polycarbonate film having a thickness of 80 μm (attached with an adhesive which is to have a thickness of 20 μm when the film is adhered to the barrier layer) was adhered to the barrier layer. In this way, an optical information recording medium was obtained.

The thus prepared optical information recording medium was set on DDU-1000 (manufactured by Pulsetec Industry Co.) provided with a laser optical system with a wavelength of 403 nm and NA of 0.85. Then, 1–7 modified random signals (2T–8T) were recorded and reproduced and jitter was evaluated. In this case, evaluation was conducted while optimizing the laser output and the emission pattern at recording at a linear velocity of 5.28 ms. Jitter was measured by using a conventional equalizer. The optimal power during the recording and the jitter are shown in Table 2.

Example 2 to Example 15

Information recording media according to the invention were prepared in the same manner as in example 1 except for changing the dye compound (I-1) to the dye compounds shown in Table 2 (in the same amount as the dye compound (I-1) in Example 1) and evaluated in the same manner as in Example 1. The results are shown in Table 2.

Comparative Example 1 to Comparative Example 5

Comparative information recording media were prepared in the same manner as in Example 1 except for changing the dye compound (I-1) to the comparative dye compounds A to E (in the same amount as the dye compound (I-1) in Example 1) and evaluated in the same manner as in Example 1. The results are shown in Table 2.

Comparative Compound (A): Compound Disclosed in the Example of JP-A No. 7-304256

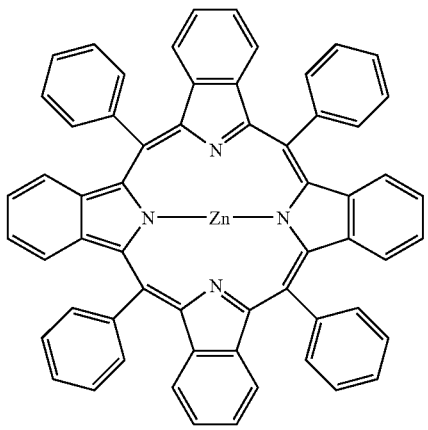

Comparative Compound (B): Compound Described in Example 1 of JP-A No. 8-127174

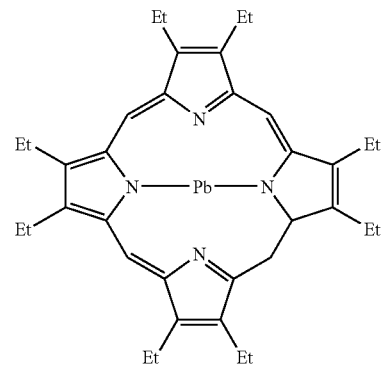

Comparative Compound (C): Compound Described in Example 1 of JP-A No. 11-334207.

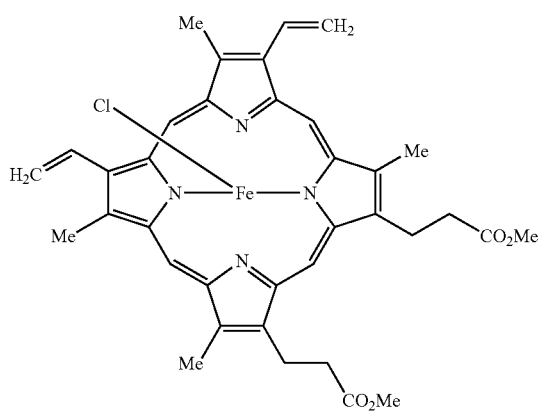

Comparative Compound (D): Compound Described in the Example of JP-A No. 2000-228028

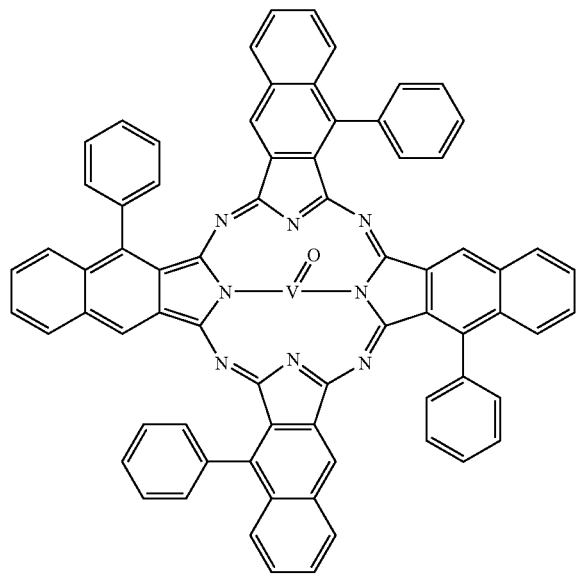

Comparative Compound (E): Compound Described in Example 13 of JP-A No. 2003-94828

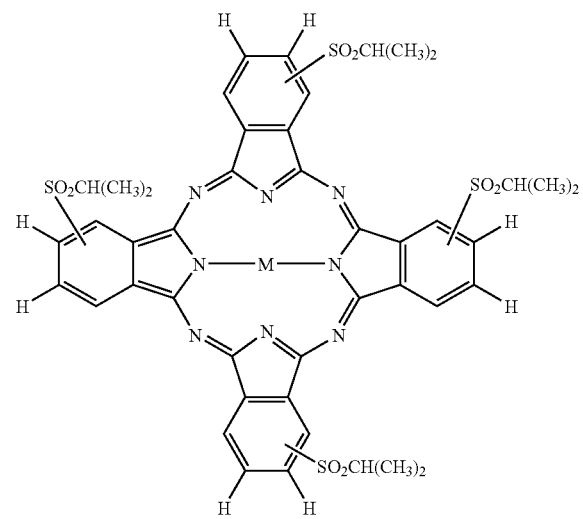

TABLE 2

| Example | Dye compound of recording layer | Optimal recording power (mW) | Jitter (%) |
|---|---|---|---|
| Example 1 | (1-1) | 4.9 | 9.3 |
| Example 2 | (1-2) | 5.0 | 9.8 |
| Example 3 | (1-3) | 4.8 | 9.6 |
| Example 4 | (1-4) | 4.9 | 9.5 |
| Example 5 | (1-5) | 4.8 | 9.3 |
| Example 6 | (1-6) | 4.5 | 9.8 |
| Example 7 | (1-7) | 4.5 | 9.2 |
| Example 8 | (1-8) | 4.4 | 9.6 |
| Example 9 | (1-9) | 4.9 | 9.3 |
| Example 10 | (1-10) | 4.7 | 9.6 |

TABLE 2-continued

| | Dye compound of recording layer | Optimal recording power (mW) | Jitter (%) |
|---|---|---|---|
| Example 11 | (1-11) | 4.4 | 9.5 |
| Example 12 | (1-12) | 5.1 | 9.9 |
| Example 13 | (1-13) | 4.0 | 9.4 |
| Example 14 | (1-14) | 5.0 | 9.9 |
| Example 15 | (1-15) | 5.2 | 9.9 |
| Comp. Example 1 | (A) | 10 | Measurement impossible |
| Comp. Example 2 | (B) | 10 | Measurement impossible |
| Comp. Example 3 | (C) | 10 | Measurement impossible |
| Comp. Example 4 | (D) | 10 | Measurement impossible |
| Comp. Example 5 | (E) | 6.5 | 10.2 |

From the result of Table 2, it was confirmed that the optical information recording media (Examples 1 to 15) having the recording layers containing the phthalocyanine derivatives (dye compounds of the invention) having the substituents represented by the formula (I) of the invention showed higher recording sensitivity to the blue-purple semiconductor laser light and lower jitter than the optical information recording media (Comparative Examples 1 to 5) having recording layers containing comparative compounds A to E.

Further, novel phthalocyanine derivatives (the dye compounds of the invention) suitable for optical information recording media are provided.

The invention can provide an optical information recording medium capable of recording and reproducing information at high density by irradiation with a laser light and particularly, the recording medium being excellent in the recording sensitivity. Further, the invention can provide an information recording method capable of recording and reproducing information at high density by irradiation with a laser light at 450 nm or less (particularly, laser light near 405 nm of high versatility) and particularly, the method providing excellent recording sensitivity. Further, the invention can provide a dye compound optimal for the information recording medium and the information recording method described above.

What is claimed is:

1. An optical information recording medium comprising a substrate and a recording layer provided on the substrate, wherein the recording layer includes a phthalocyanine derivative having a substituent of the following formula (I):

Formula (I)

wherein in Formula (I), $R^1$, $R^2$ and $R^3$ each independently represent a substituent other than a hydrogen atom.

2. The recording medium according to claim 1, wherein the substituent represented by the formula (I) is substituted on an α-position of the phthalocyanine derivative.

3. The recording medium according to claim 1, wherein a center metal or a center metal compound of the phthalocyanine derivative is a metal selected from the group consisting of copper, nickel, iron, cobalt, palladium, magnesium, aluminum, zinc, silicon and vanadium, or an oxide containing at least one of the metals, wherein the metal or the oxide may have a ligand.

4. The recording medium according to claim 1, wherein a light reflection layer including a metal is provided on the substrate.

5. The recording medium according to claim 1, wherein a protective layer is provided on the substrate.

6. The recording medium according to claim 1, wherein the substrate is a transparent disk-like substrate having pre-grooves at a track pitch of from 0.2 to 0.5 μm, and the recording layer is provided on the pre-groove side of the substrate.

7. The recording medium according to claim 1, wherein molecules of the phthalocyanine derivative are bonded to each other to form a multimer.

8. The recording medium according to claim 1, wherein the phthalocyanine derivative is bonded to a polymer chain.

9. The recording medium according to claim 1, wherein each of $R^1$, $R^2$ and $R^3$ in Formula (I) is a halogen atom, an alkyl group having 1 to 30 carbon atoms, a cyano group, a substituted or non-substituted alkylcarbonyl group having 2 to 30 carbon atoms, or a substituted or non-substituted alkoxycarbonyl group having 2 to 30 carbon atoms.

10. The recording medium according to claim 1, wherein the phthalocyanine derivative includes isomeric phthalocyanine derivatives which are different in substitution position(s) of the substituent of Formula (I).

11. An information recording method comprising: providing the optical information recording medium according to claim 1; and irradiating the recording medium with laser beams at a wave length of 450 nm or less.

12. The recording method according to claim 11, wherein the laser beams are radiated from the substrate side.

13. The recording medium according to claim 11, wherein the laser beams are radiated from the opposite side to the substrate side.

14. A dye compound represented by the following formula (II):

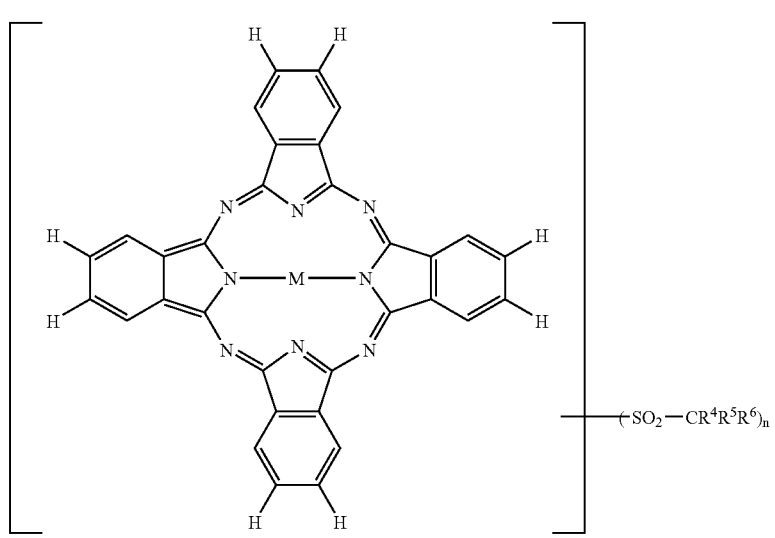

Formula (II)

wherein in Formula (II), M represents a metal selected from the group consisting of copper, nickel, iron, cobalt, palladium, magnesium, aluminum, zinc, silicon and vanadium, or an oxide containing at least one of the metals wherein the metal or the oxide may have a ligand; $R^4$, $R^5$ and $R^6$ each independently represent a substituent other than a hydrogen atom; and n is an integer of from 1 to 8, wherein at least one of α-positions of the dye compound is substituted with a substituent other than a hydrogen atom.

15. The dye compound according to claim 14, wherein each of $R^4$, $R^5$ and $R^6$ in Formula (II) is a halogen atom, an alkyl group having 1 to 30 carbon atoms, a cyano group, a substituted or non-substituted alkylcarbonyl group having 2 to 30 carbon atoms, or a substituted or non-substituted alkoxycarbonyl group having 2 to 30 carbon atoms.

16. The dye compound according to claim 14, wherein each of $R^4$ to $R^6$ represents an alkyl group having 1 to 30 carbon atoms.

* * * * *